Dec. 30, 1969 W. H. RYAN 3,487,166

SYNCHRONIZING GENERATOR

Filed Dec. 15, 1966 5 Sheets-Sheet 1

INVENTOR
WILLIAM HOWARD RYAN

BY Browne, Schuyler & Beveridge

ATTORNEYS

INVENTOR
WILLIAM HOWARD RYAN

BY Browne, Schuyler & Beveridge

ATTORNEYS

INVENTOR
WILLIAM HOWARD RYAN
BY Brown, Schuyler & Beveridge
ATTORNEYS

PULSE FORMER WAVEFORMS

INVENTOR
WILLIAM HOWARD RYAN

BY Browne, Schuyler & Beveridge
ATTORNEYS

NOTE: NUMBERS FOLLOWING "I" BLOCK NUMBERS REFER TO BLOCK TERMINAL PINS, e.g. I 49,6 READ AS BLOCK I-49, PIN 6 (FIG.4)

INVENTOR
WILLIAM HOWARD RYAN

BY Browne, Schuyler & Beveridge
ATTORNEYS

United States Patent Office 3,487,166

Patented Dec. 30, 1969

3,487,166

SYNCHRONIZING GENERATOR

William H. Ryan, Toledo, Ohio, assignor to Owens-Illinois, Inc., a corporation of Ohio Filed Dec. 15, 1966, Ser. No. 602,098
Int. Cl. H04l 7/00; H03k 1/00
U.S. Cl. 178—69.5 19 Claims

ABSTRACT OF THE DISCLOSURE

A television synchronizing generator utilizing integrated circuit components. Pulses from a high frequency or pulse rate source (1.575 mc.) are applied to a divider chain to produce basic pulses at the different stages thereof and these basic pulses are applied to a pulse former section which produces the five basic synchronizing pulses for standard television stations, namely, horizontal sync pulses, horizontal drive pulses, blanking pulses and equalizing pulses. In one embodiment all binary circuitry is utilized, eliminating the alignment problem and no adjustments and time delay devices are required. In a second embodiment of the pulse former section three adjustments are provided in conjunction with a single fixed delay line. In both embodiments the pulse former section also produces grating pulses for use as test signal (cross bar, dot generator, etc.) and control pulses for the compositing section. The pulse former section supplies the basic synchronizing pulses to a compositing section which includes binary logic circuitry. Synchronizing signals so produced are utilized in a conventional manner.

The present invention relates to synchronizing generators and, more particularly, to a novel means for producing a plurality of complex timing pulses as used in conventional television systems.

Present day commercial television synchronizing signal generators are fairly expensive, occupy a relatively large amount of storage space, consume relatively large amounts of power, and are difficult to maintain in alignment. Moreover, extant commercial television synchronizing pulse generators are difficult to align for satisfactory operation.

The object of the present invention is to provide an improved signal generator for generating synchronizing signals for television systems using integrated circuit components as the building blocks thereof.

A further object of the invention is to provide such a signal generator which is temperature independent and which requires minimum or no adjustments to secure proper operation of the generator. In addition, the invention provides the operator with a variety of test signals in addition to the synchronizing signals per se.

A more complete understanding of the operation of the present invention, as well as numerous other objects and features of advantage in addition to those set forth hereinabove, will be gleaned from a perusal of the following specification, especially when taken in connection with the accompanying drawings, in which FIG. 1 is a block diagram of a conventional television station;

Figure 5A:
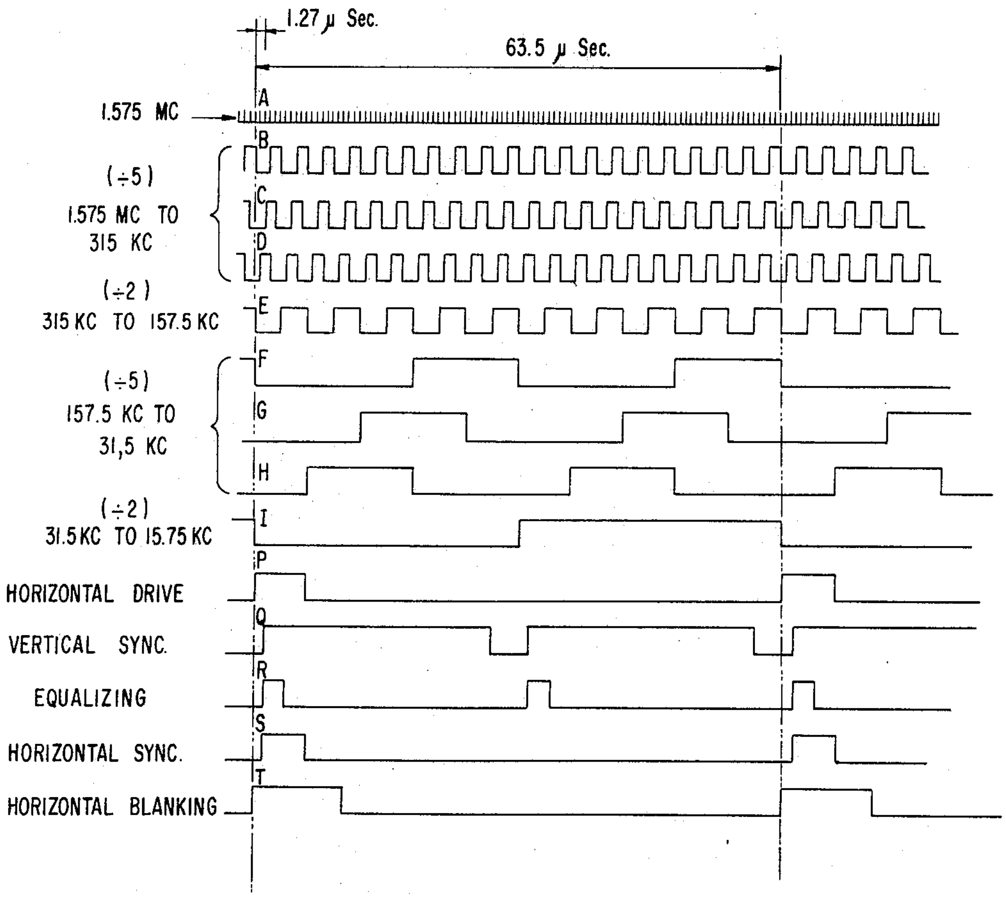
Figure 5B:
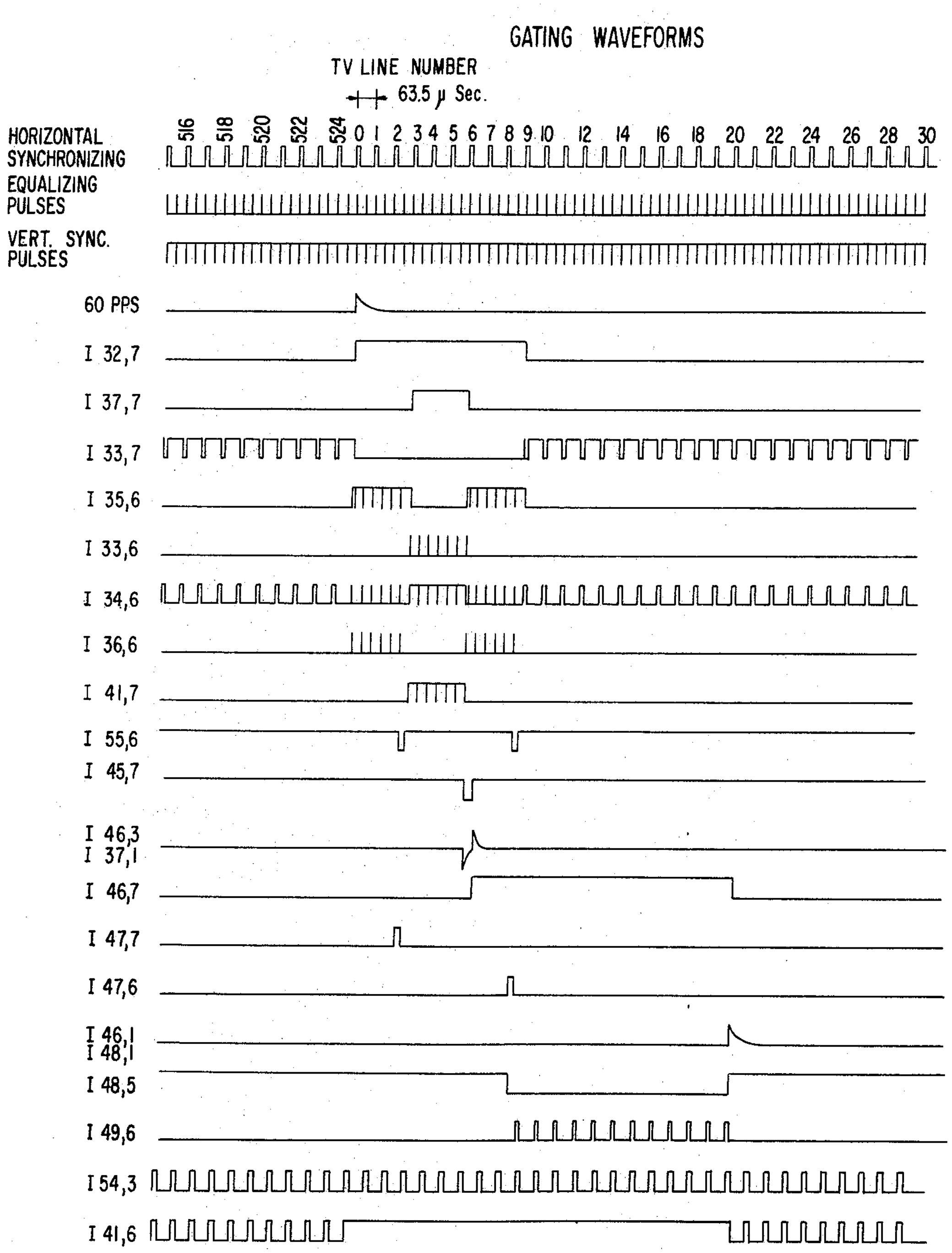

FIG. 5*a* and FIG. 5*b* are waveform diagrams showing the invention.

As is well known, the function of the horizontal and vertical drive pulses is to drive or trigger the camera sweep circuits; the function of the blanking pulses is to blank out the signal picked up by the camera scanning beam during vertical and horizontal retrace time. The composite sync signals are combined with the video signals from the camera and transmitted to receivers and are used to maintain the receiver in synchronism with vertical and horizontal scanning of the camera circuits. Conventionally, for a standard 525 line television system, the horizontal sync pulses are 5.08 microseconds wide and occur at 15,750 pulses per second; horizontal blanking pulses are 10.795 microseconds wide and occur at 15,750 pulses per second; vertical sync pulses are 27.3 microseconds long and occur at 31,500 pulses per second, equalizing pulses are 2.54 microseconds wide and occur at 31,500 pulses per second. Vertical blanking signals occur at 21 horizontal lines or 12 lines after the last equalizing pulse.

The invention utilizes commercially available integrated circuit components such as those produced by the Fairchild Semiconductor Division of Fairchild Instrument Corporation. Such integrated circuit components are used in accordance with the following schedule:

| Fairchild Part No.: | Function |
|---|---|
| 902 | Flip-flop element, F.F.I. |
| 903 | Three—input nand gate element, Gate-3 |
| 914 | Dual two—input nand gate element, Gate-2 or ½ Gate-2 |
| 923 | JK flip-flop element, JKFF |

Circuit description and functions are included in various publications of that company and a detailed explanation of their operation is not necessary for an understanding of the present invention. In the following description, use of "pin" numbers refer to input and output terminals of the Fairchild Micrologic component involved. Reference to power terminal or unused terminals have been omitted for purposes of clarity and obtention of a clear understanding of the invention.

Figure 1:
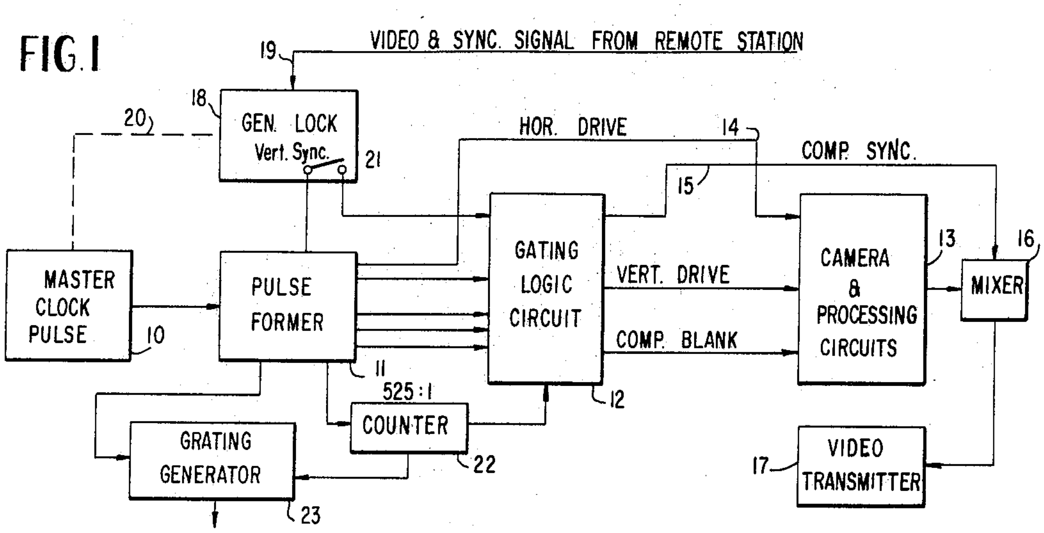
Figure 3:
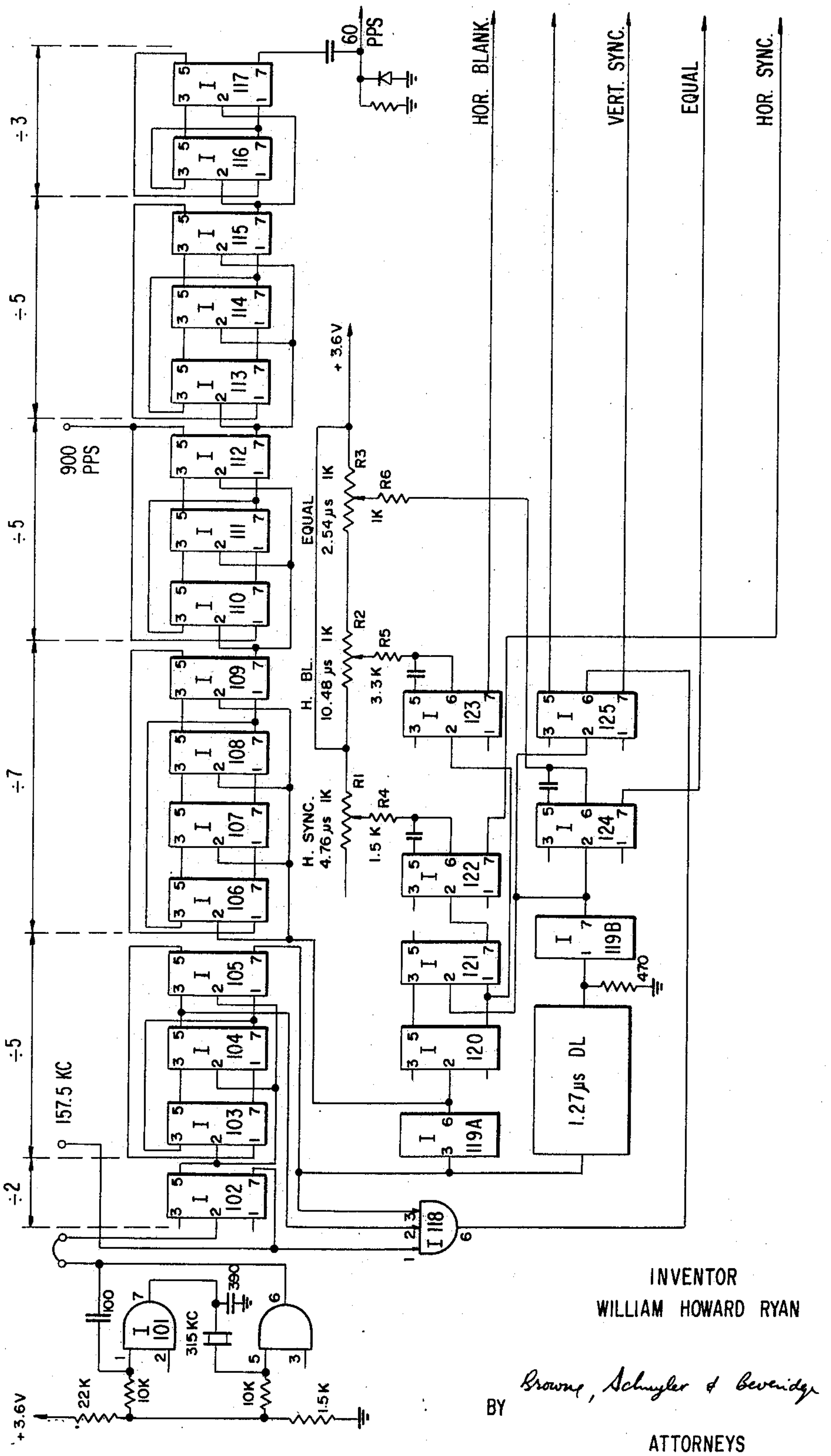
FIG. 3 is a block diagram of another embodiment of the pulse former shown in block 11 of FIG. 1.
Figure 4:
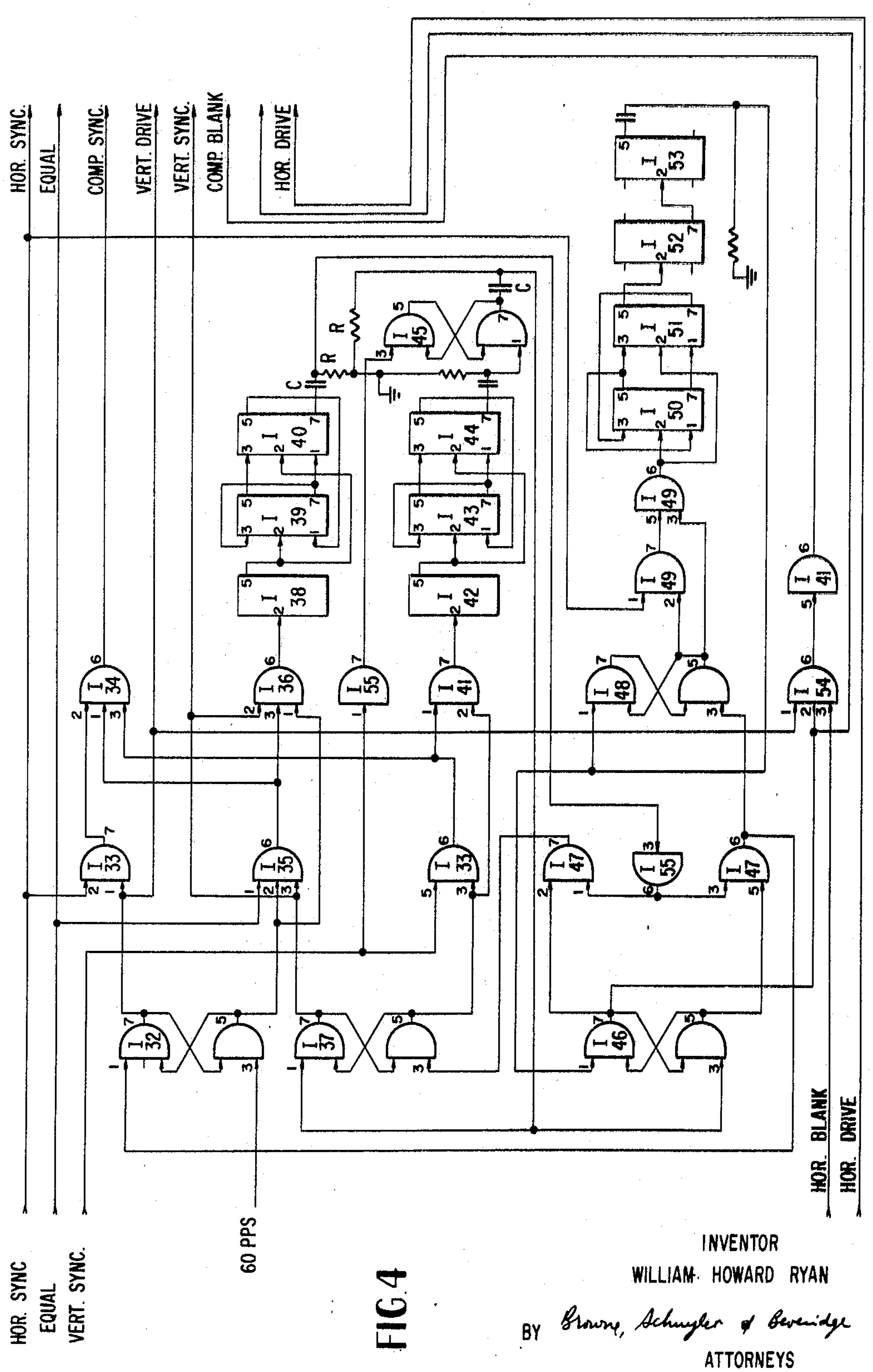
FIG. 4 is a block diagram of a gating and logic circuitry shown in block 12 of FIG. 1 and usable either with the pulse former circuit shown in FIG. 2 or FIG. 3.

With reference to FIG. 1, except for pulse former 11 and gating and logic circuit 12 (shown in detail in FIGS. 2, 3 and 4), the overall purpose and operation of the elements shown are conventional in that master clock pulse generator 10 may or may not be used to synchronize with a remote station by means of the dotted connection 20 to generator lock circuit 18. Master clock pulses from master clock pulse generator 10 are applied to the pulse former circuit 11 to produce conventional horizontal blanking pulses, vertical synchronizing pulses, horizontal synchronizing pulses, equalizing pulses, etc., all as used in a conventional/video or television synchronizing system. Some of the outputs of the pulse former circuitry are applied directly through to the camera and/video processing circuit 13. The vertical synchronizing pulse may likewise be controlled by a switch 21 in generator lock circuit 18 likewise in a conventional manner. The remaining pulses from the pulse former circuitry are applied to the gating and logic circuit for producing a composite synchronizing signal and a composite blanking signal and a vertical drive signal which, with the horizontal drive signal on line 14 from the pulse former circuitry, are utilized in a conventional manner to control the camera and processing circuits 13. The output from the camera and processing circuits comprises the usual video signals which are combined in mixer circuit 16 with the composite synchronizing signal and applied to a video transmitter 17, in a conventional manner.

As will be explained more fully hereinafter, the master clock generator 10 has a high enough pulse rate or frequency that the pulse former circuit 11 is able to produce a grating signal which is applied to a grating signal generator I–23, the output of grating signal generator I–23 being used for conventional test purposes. The grating generator I–23 has a second input from a counter I–22.

The present invention is concerned primarily with the pulse former circuit 11 and the gating and logic circuit 12 shown in FIG. 1. With reference now to the embodiment of the pulse former circuit shown in FIG. 2, all block elements disclosed are of the integrated or microelectronic circuit type. In some cases, one microelectronic circuit may have particular functional aspects thereof separated and utilized in different portions of the circuit. In this case, the designation A and B following an integrated circuit numeral designation indicates such a situation (e.g., I–119A).

PULSE FORMER SECTION PREFERRED EMBODIMENT—FIG. 2

Master clock pulses from a 1.575 megacycle generator (FIG. 1) drive integrated circuit pulse amplifier 31. The square wave output (line A, FIG. 5*a*) of amplifier I–31 drives a 5:1 divider comprising counter blocks I–2, I–3, and I–4 and the 315-kilocycle output (line B, FIG. 5*a*) of this divider drives a 2:1 divider, I–5. The 2:1 divider output (line E, FIG. 5*a*) is then divided by 5 by I–6, I–7, and I–8. The 31.5 kilocycle pulses from this divider drive I–9 for a division by two (line I, FIG. 5*a*) and also drive the 525:1 divider which consists of four divider stages: a division by 7 using I–20, I–21, I–22, and I–23; a division by 5 using I–24, I–25, and I–26; another division by using I–27, I–28, and I–29; and, a division by 3 using I–30 and I–31. The output of the last divider is differentiated by an R-C differentiator and the 60 pulses per second positive-going spike is used to initiate the vertical synchronization interval.

Figure 2:
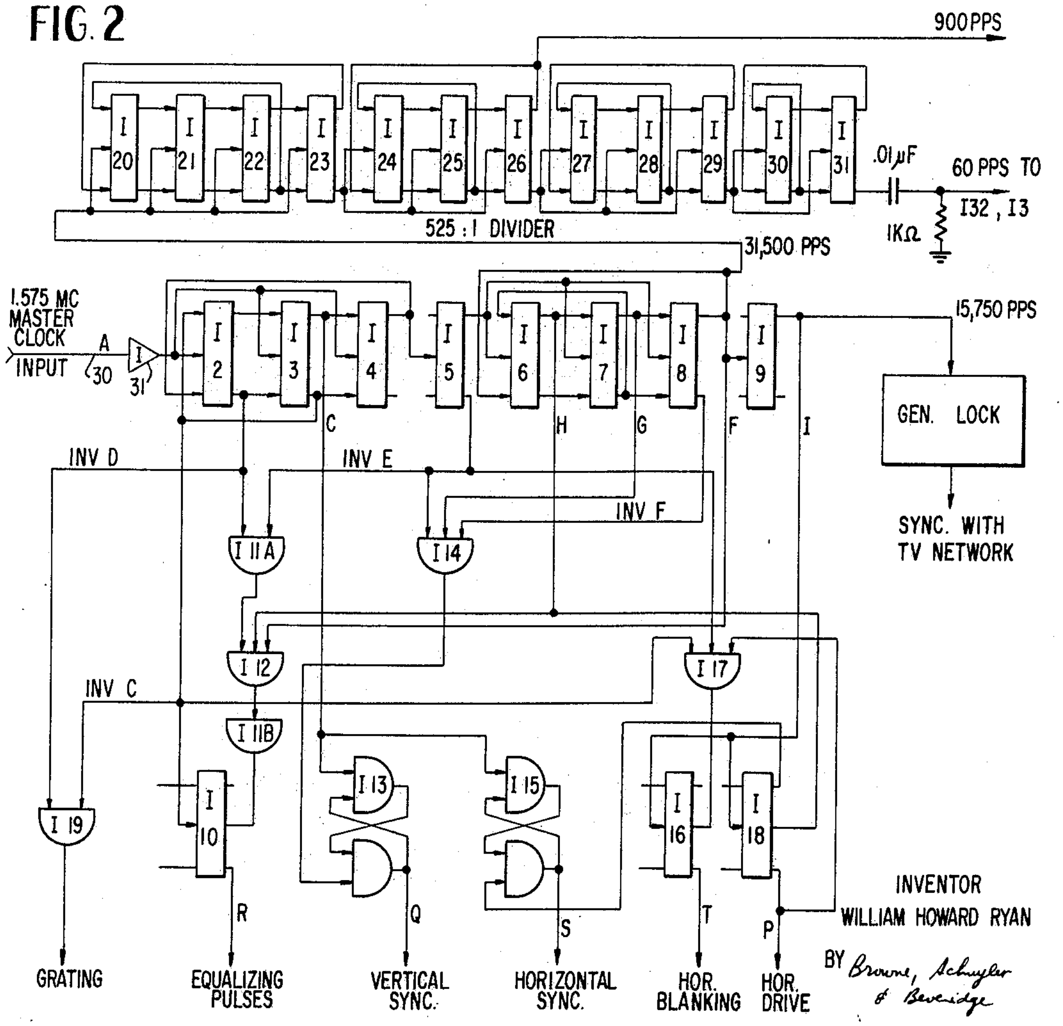
FIG. 2 is a block diagram of one embodiment of the pulse former circuitry illustrated in block 11 of FIG. 1.

In FIG. 2, nine signals from the first four dividers (I–2, I–3, I–4, and I–5; and I–6, I–7, I–8, and I–9) are combined to form the five basic pulses (lines P, Q, R, S and T of FIG. 5*a*) used in this system.

GENERATION OF HORIZONTAL DRIVE PULSES

The horizontal drive pulses occur at the horizontal line rate and have a duration of one-tenth of the horizontal line period (H). This is effected in this system by a JK flip-flop, I–18.

Waveform I appears at I–9, pin 5. The change of state of this signal from ON (+1.5 v.) to OFF (0 v.) causes the output of I–18, pin 7, to turn ON. I–18 is reset at the proper time by the signal at I–6, pin 5, waveform H. The output waveform at I–18, pin 7, is shown as the horizontal drive waveform P.

GENERATION OF VERTICAL SYNC PULSES

Vertical sync pulses occur at twice the rate of waveform H, starting at 0.02H after the horizontal drive and blanking pulses, and have a duration of 0.42H. These vertical sync pulses are generated using a flip-flop, I–13, and a three-input nand gate, I–14. A turn-ON pulse is obtained from I–3, pin 5, waveform C. This flip-flop then stays ON until it receives an OFF pulse from the I–14 nand gate. All inputs to I–14 must be OFF to produce an output pulse. The signals which are combined to produce this OFF pulse come from: I–5, pin 7, inverted waveform E; I–7, pin 5, waveform G; and, I–8, pin 7, inverted waveform F. The output of I–13 is shown as the vertical sync pulses waveform Q.

GENERATION OF EQUALIZING PULSES

Equalizing pulses occur at twice H, start in coincidence with the vertical and horizontal sync pulses and have a duration of 0.04H. These pulses are generated using a JK flip-flop, I–10, a dual 2-input nand gate, I–11 (shown as I–11A and I–11B), and a 3-input nand gate, I–12. The JK flip-flop, I–10, pin 7, is turned ON by a change from ON to OFF of a signal from I–3, pin 7, inverted waveform C, at the complement input pin 2 of I–10. I–10 is turned OFF by the coincidence of OFF states of I–2, pin 7, inverted waveform D, and I–5, pin 7, inverted waveform E, in nand gate I–11A. This coincidence of OFF states produces an ON state at the output of gate I–11A. This is inverted in I–12 and again inverted in I–11B; appearing again as an ON state at I–10, pin 6, the reset input of the equalizing pulse flip-flop. This flip-flop must be kept reset for the remainder of the 0.5H period. This is done with signals from I–6, pin 5, waveform H, and I–8, pin 5, waveform F, combined and inverted in I–12 and again inverted in I–11B producing an ON state at I–10, pin 6, whenever either H or F are ON or inverted D and inverted E are OFF. This leaves a short time between the time inverted D and inverted E are OFF and the time H comes ON but the complement input of I–10 does not change from ON to OFF during this time; therefore, the flip-flop does not change state. The output of I–10 is shown as the equalizing pulses waveform R.

GENERATION OF HORIZONTAL SYNC PULSES

Horizontal sync pulses occur at the horizontal line frequency, have a duration of 0.08H and start in coincidence with the vertical sync pulses and the equalizing pulses or 0.02H after the horizontal drive and horizontal blanking pulses. The horizontal sync pulses are formed using a flip-flop, I–15. An ON pulse is obtained from I–3, pin 5, waveform C. An OFF signal is obtained from I–18, pin 5, which is an inverted horizontal drive pulse. Many ON pulses which are not to be used are fed to I–15. This signal from I–18, pin 5, holds I–15 in the OFF state until just before it is to be turned ON by the proper ON pulse from I–3, pin 5. The output of I–15 is shown as the horizontal sync waveform S.

GENERATION OF HORIZONTAL BLANKING PULSES

Horizontal blanking pulses occur at the horizontal line frequency, have a duration of 0.17H and start in coincidence with the horizontal drive pulses. Horizontal blanking pulses are produced using a JK flip-flop I–16 and a 3-input nand gate I–17.

The horizontal blanking flip-flop, I–16, is turned ON by a change from ON to OFF of the signal from I–9, pin 5, waveform I, appearing at the complement input pin 2 of I–16. I–16 is turned OFF by an ON signal at its reset pin 6. This signal is produced by the coincidence of OFF states of the signals from: I–3, pin 7, inverted waveform C; I–5, pin 7, inverted waveform E; and, the horizontal drive pulses from I–18, pin 7, waveform P. The output of I–16 is shown as horizontal blanking pulses waveform T.

PULSE FORMER (FIG. 3)

The master timing pulses are produced by a 315.000 kilocycle crystal oscillator using a dual 2-input nand-gate, I–101 (these I-numbers refer to the circuits shown), biased for linear operation. The frequency is determined by a quartz crystal in the feedback circuit. The oscillator output is a square wave; and, as in the case of the pulse former shown in FIG. 2, it is available for triggering a grating generator and, also, to drive a 2:1 divider. The 2:1 divider utilizes a JK flip-flop, I–102. The 157.5 kilocycle output of this divider drives a stair case linearity generator and a 5:1 divider. A 3-input nand-gate, I–118, is connected to the 2:1 and 5:1 dividers to get an output pulse on receipt of the ninth input pulse. This pulse is used later to reset the vertical pulse flip-flop. The output of the 5:1 divider, 31.5 kilocycle pulses, drives ½ of a dual 2-input nand-gate, I–119A, used as an inverter, and a 1.27 microsecond delay line. The output of the inverter, I–119A, drives the first JK flip-flop, I–120, of a synchronized delayed and undelayed divider. The output of the delay line drives the second JK flip-flop, I–121, of this divider after being inverted by I–119B. The inverter I–119A also drives a 7:1 divider, I–106, I–107, I–108, and I–109, which in turn drives a 5:1 divider, I–110, I–111, and I–112. The 900 pulse per second output of this 5:1 divider triggers a grating generator and drives another 5:1 divider, I–113, I–114, and I–115, which, in turn, drives a 3:1 divider, I–116 and I–117. The 60 pulse per second output of this divider (I–116, I–117) is differentiated by an R-C differentiator and used to initiate the vertical synchronization block.

The 31.5 kilocycle pulses from the delayed pulse inverter, I–119B also drives a JK flip-flop, I–24, used as a monostable pulse generator to produce 2.54 microsecond equalizing pulses. The output from I–119B also sets the JK flip-flop, I–125, which is reset by the pulse from I–118 to produce 27.3 microsecond vertical synchronizing pulses. The undelayed 15.75 kilocycle output of flip-flop I–120 drives a JK flip-flop, I–123 also, used as a monostable pulse generator to produce 10.48 microsecond horizontal blanking pulses. The delayed 15.75 kilocycle output of I–121 drives JK flip-flop, I–122 also, used as a monostable pulse generator to produce 4.76 microsecond horizontal synchronizing pulses.

COMPOSITING OR GATING SECTION (FIG. 4)

The five basic pulses generated by the pulse former section (embodiments shown in FIGS. 2 and 3) are combined in the gating section to form the composite synchronization wave forms.

Before receipt of the vertical synchronization block initiating pulse, I–32, I–37, I–46, and I–48 output pins 5 are up. Horizontal synchronizing pulses are applied to one input of a 2-input nand gate I:33. The other input is driven by a gating signal from I–32, pin 7, which is down except during the vertical synchronizing interval, thus passing and inverting the horizontal synchronizing pulses. These pulses are applied to one input of a 3-input nand gate, I–34. This gate serves only to mix and invert any pulses which have been gated to one of its inputs.

Upon receipt of the vertical synchronization block initiating pulse, output pin 7 of I–32 goes up, removing horizontal pulses from the input to I–34; and output pin 5 of I–32 goes down, allowing equalizing pulses to be transmitted and inverted from the equalizing pulse flip-flop, I–10, to the synchronizing pulse mixer, I–34, and to a counter gate, I–36. I–36 is also gated from output pin 5 of I–32 and output pin 7 of I–37; thus, passing only equalizing pulses. The counter, I–38, I–39, and I–40 counts to six and produces a differentiated positive pulse which is applied to I–45 input pin 1. This drives I–45 output pin 7 down, producing no effect. In order to avoid gating pulses in some time after the pulse has begun, I–45 is reset by the longest pulses used: the vertical synchronization pulses. This reset pulse is obtained from output pin 7 of I–13; the vertical synchronization pulse generator inverted by I–55*a* and applied to I–45, pin 3.

Output pin 7 of I–45 is driven positive when I–45 is reset. This is differentiated and inverted, producing a negative pulse at one input of I–47*a* and I–47*b*, a dual 2-input nand gate. Since I–46, output pin 7, is now down, a positive pulse appears at output pin 7 of I–47*a*. This pulse is applied to input pin 3 of I–37 and drives its output pin 7 up, turning off the equalizing pulses, and pin 5, I–37, down permitting vertical synchronizing pulses from I–13 to be transmitted and inverted through I–33 to the synchronizing pulse mixer, I–34, and also to another counter gate, I–41, which passes only vertical pulses. These pulses are counted by I–42, I–43, and I–44. Upon receipt of the sixth pulse, a differentiated positive pulse is obtained and applied to input pin 3 of I–46 (driving output pin 7 up and pin 5 down) and to input pin 1 of I–37 (driving its output pin 5 up) gating the vertical synchronizing pulses OFF, and driving output pin of I–37 down again gating the equalizing pulses ON through I–35 and I–34, and through I–35 and I–36 to the counter, I–38, I–39, and I–40, and differentiated as before, setting I–45.

I–45 is then reset at the end of the vertical synchronizing pulse producing, after differentiation, a positive pulse which is inverted by I–55 and applied to one input of I–47*a* and I–47*b*. This time, since I–46 has changed state upon completion of the vertical pulses, the second half of I–47 passes the pulse from I–55 to input pin 1 of I–32, thus again turning on the horizontal pulses. This sequence has produced a pulse-train starting with horizontal synchronizing pulses, then six equalizing pulses, then six vertical synchronizing pulses, then another six equalizing pulses, and then resuming horizontal synchronizing pulses. This is the composite synchronizing signal and appears at output pin 6 of I–34.

The output pulse from I–47*b* also drives input pin 3 of I–48. Output pin 5 of I–48, which had previously been up, is now driven down allowing horizontal synchronizing pulses to pass through the gates, I–49*a* and I–49*b*, to a counter I–50, I–51, I–52, and I–53. This counter output is differentiated and provides a positive output pulse upon receipt of the twelfth horizontal pulse. This positive pulse is routed to input pin of I–48 and input pin 1 of I–46, resetting both of these flip-flops.

The composite blanking signal is made up from the horizontal blanking signal from I–16, the output from I–32, pin 7, which is up for fifteen horizontal pulses, and the output from I–46, pin 7, which is up from the tenth to the twenty-first horizontal pulse after the vertical synchronizing block initiating pulse. These pulses are combined in a 3-input nand gate, I–54, and inverted by I–41*b*. The composite blanking signal is available at output pin 6 of I–41*b*. The horizontal drive is taken from the horizontal drive pulse generator, I–18. The vertical drive is taken from I–32 output pin 7 or from I–37 output pin 7.

The synchronizing generator described herein produces synchronizing pulses for a standard 525-line television system with interlaced scanning and equalizing pulses.

The horizontal synchronizing pulses are 5.08 microseconds long and occur at 15,750 pulses per second. The horizontal blanking pulses are 10.795 microseconds long and also occur at 15,750 pulses per second. The equalizing pulses are 2.54 microseconds long and occur at 31,500 pulses per second. In FIG. 2, there are no manual adjustments for the synchronizing, blanking, or equalizing pulse lengths; or, for any other item. Thus, the circuit of FIG. 2 is fixed to operate in only one mode. The vertical synchronizing pulses are fixed at 27.3 microseconds and occur at a rate of 31,500 pulses per second. The vertical blanking interval is fixed at 21 horizontal lines or 12 lines after the last equalizing pulse. Pulse jitter from any output is less than 2 nanoseconds. Pulse position accuracy is approximately 10 nanoseconds. All logic voltages are: OFF=0 v., ON=+1.5 v. Supply voltage is 3.6 v.±0.5 v. and the current drain is approximately 800 milliamperes.

While several embodiments of the invention have been shown and described herein, it is to be understood that the invention is not to be limited to the specific features shown and that modifications and variations may be made without departing from the spirit and scope thereof.

What is claimed is:

1. A solid state television synchronizing generator comprising a source of high frequency master clock signals, having a frequency substantially greater than the frequency of any television synchronizing signals to be generated, a cascade chain of counter circuits, said cascade chain of counter circuits consisting essentially of a series of integrated circuit components and having output terminals at selected stages thereof to produce a set of digitally related pulse trains and a set of like related inverted pulse trains, fixed generator means consisting essentially of integrated circuit components for generating from said sets of pulse trains substantially invariable television synchronizing signals including, equalizing pulses, vertical synchronizing (sync) pulses, horizontal synchronizing (sync) pulses horizontal blanking pulses and horizontal drive pulses, and gate means consisting essentially of integrated circuit components for controlling the application of said pulse trains to said generator means.

2. A solid state television synchronizing generator comprising a source of high frequency master clock signals, a cascade chain of counter circuits, said cascade chain of counter circuits having output terminals at selected stages thereof to produce a set of digitally related pulse trains and a set of like related inverted pulse trains, generator means for generating from said sets of pulse trains equalizing pulses, vertical synchronizing (sync) pulses, horizontal synchronizing (sync) pulses, horizontal blanking pulses and horizontal drive pulses, and gate means for controlling the application of said pulse trains to said generator means, said means for generating said equalizing pulses comprises a flip-flop circuit, control means for said flip-flop circuit comprising means for supplying a pulse from a stage of said cascade chain of counter circuits to turn said flip-flop ON, and a cascaded pair of gate circuit elements, the first of said gate elements being controlled by coincidence of a pair of pulses from selected stages of said cascade chain of counter circuits and the second of said gate elements having means for supplying as input control pulses thereto the output of said first gate element and at least two further selected stages of said cascade chain of counter circuits of lower pulse rates, the output of said second gate element being effective to maintain said flip-flop OFF for a predetermined time interval.

3. A solid state television synchronizing generator comprising a source of high frequency master clock signals, a cascade chain of counter circuits, said cascade chain of counter circuits having output terminals at selected stages thereof to produce a set of digitally related pulse trains and a set of like related inverted pulse trains, generator, means for generating from said sets of pulse trains equalizing pulses, vertical synchronizing (sync) pulses, horizontal synchronizing (sync) pulses, horizontal blanking pulses and horizontal drive pulses, and gate means for controlling the application of said pulse trains to said generator means, said means for generating vertical sync pulses comprises a vertical sync flip-flop circuit, means for supplying a pulse from a selected stage of said cascade chain of counter circuits to said flip-flop circuit to turn same ON, a vertical gate circuit element means for applying as input pulses to said vertical gate circuit element the output of at least three selected stages of said cascade chain of counter circuits, said vertical gate circuit element producing an output pulse when all of its input pulses from said three selected stages are OFF, to thereby turn said flip-flop circuit OFF.

4. A solid state television synchronizing generator comprising a source of high frequency master clock signals, a cascade chain of counter circuits, said cascade chain of counter circuits having output terminals at selected stages thereof to produce a set of digitally related pulse trains and a set of like related inverted pulse trains, generator, means for generating from said sets of pulse trains equalizing pulses, vertical synchronizing (sync) pulses, horizontal synchronizing (sync) pulses, horizontal blanking pulses and horizontal drive pulses, and gate means for controlling the application of said pulse trains to said generator means, said means for generating said horizontal drive pulses comprises a horizontal drive flip-flop circuit, means for applying the output of a first selected stage of said cascade chain of counter circuits to said horizontal drive flip-flop to turn same ON, and means for applying the output of a second selected stage of said cascade chain of counter circuits to said horizontal drive flip-flop to turn same OFF a predetermined time interval later.

5. The invention defined in claim 4 wherein said means for generating said horizontal sync pulses comprises a horizontal sync flip-flop, means for applying the output of a selected stage of said cascade chain of counter circuits to said horizontal sync flip-flop to turn same ON, and means for obtaining an inverted horizontal drive pulse from said horizontal drive flip-flop, and applying same to said horizontal sync flip-flop to turn same OFF.

6. The invention defined in claim 4 wherein said means for generating said horizontal blanking pulses comprises a horizontal blanking flip-flop, means for applying the output of said horizontal drive flip-flop as one input to said horizontal blanking gate circuit and the inverted outputs of at least two selected stages of said cascade chain of counters, said horizontal blanking gate circuit producing an output signal when the inputs thereto are all OFF, said output signal being effective to turn said horizontal blanking flip-flop OFF.

7. The invention defined in claim 6 wherein said means for generating said equalizing pulses comprises an equalizing pulse flip-flop circuit, control means for said equalizing pulse flip-flop circuit comprising means for supplying pulses from a stage of said cascade chain of counter circuits to turn said flip-flop ON, and a cascaded pair of equalizing pulse gate circuit elements, the first of said equalizing pulse gate elements being controlled by coincidence of a pair of pulses from selected stages of said cascade chain of counter circuits and the second of said equalizing pulse gate elements having means for supplying as inputs control pulses thereto the output of said first gate element and at least two further selected stages of said cascade chain of counter circuits of lower pulse rates, the output of said second gate element being effective to maintain said flip-flop OFF for a predetermined time interval.

8. The invention defined in claim 7 wherein said means for generating vertical sync pulses comprises a vertical sync flip-flop circuit, means for supplying a pulse from a selected stage of said cascade chain of counter circuits to said vertical sync flip-flop circuit to turn same ON, a vertical gate circuit element, means for applying as input pulses to said vertical gate circuit element the output of at least three selected stages of said cascade chain of counter circuits, said vertical gate circuit element producing an output pulse when all of its input pulses from said three selected stages are OFF, to thereby turn said vertical sync flip-flop circuit OFF.

9. In a solid state television synchronizing generator wherein a train of fixed high frequency timing pulses are applied to a service of cascaded divider circuits and the various outputs of the divider circuits are utilized to produce a set of secondary pulses which are combined to produce television synchronizing signals including horizontal sync pulses, vertical sync pulses, equalizing pulses, horizontal blanking pulses and horizontal drive pulses, a combining circuit comprising a set of bistable flip-flop elements each having a set and re-set terminals for input signals and a pair of output terminals, a mixer circuit, a first of said bistable flip-flop elements adapted to alternately control the passage of horizontal sync pulses and said equalizing pulses, to said mixer circuit, a second of said bistable flip-flop elements adapted to alternately control the passage of equalizing pulses and vertical sync pulses to said mixer circuit, gate means between selected ones of said synchronizing signal sources and said mixer circuit, including a first two-input gate element having one input connected to an output of said first bistable element and its other input connected to receive said horizontal sync pulses; a three input gate element having one input connected to receive the inverted output of said first bistable element, a second input connected to receive said equalizing pulses, and a third input connected to receive an output from said second bistable element; a second two-input gate element, one input of said second gate element being connected to receive said vertical sync pulses and the second of said inputs being connected to receive an inverted output from said second bistable element, said series of cascaded divider circuits further producing a relatively low frequency control pulse which is applied to said first bistable element to initiate a change in its state.

10. The invention defined in claim 9 including a second three input gate element, a first input of said second three-input gate element being connected to receive the output from said second bistable element as applied to the said third input of the first said three-input gate element, the second input of said second three input gate element being connected to receive equalizing pulses from the first said three-input gate element, and the third input of said second three element gate circuit being connected to receive an output from said first bistable element, a counter circuit connected to said second three-input gate element, said counter producing an output pulse upon a predetermined number of equalizing pulses being applied thereto, and control means connecting the output of said counter circuit to said second bistable element to shift the state thereof to terminate further passage of equalizing pulses to said mixer circuit.

11. The invention defined in claim 10 including further two-input gate element, said two-input gate element having as applied to one input thereof the vertical sync pulse output of said second two-input gate element, and as a second input the said inverted output of said second bistable element, a counter circuit connected to receive the vertical sync output of said further two-input gate element, said counter producing an output upon a predetermined number of vertical sync pulses being applied thereto, the output of said counter circuit being applied to said control means to further control said second bistable element.

12. The invention defined in claim 11 wherein said control means include a bistable element, and means for changing the state of said bistable element by said vertical sync pulses.

13. The invention defined in claim 12 including a third bistable element settable to one state by the signal from said control means as applied to said second bistable element, and settable to its opposite state by a further control signal, means for generating said further control signal comprising a pair of two input gate elements, one input of each gate element being respectively coupled to one output of said third bistable element, means for applying the signal from said control means to the other inputs of said pair of two-input gate elements, means for applying the output of one of said pair of two-input gate elements to said second bistable element to change the state thereof, means for applying the output of the other of said pair of two-input gate elements to the first of said bistable elements to change the state thereof, a fourth bistable element, means for further applying the output of said other of said pair of two-input gate elements to said fourth bistable element to change the state thereof, a cascaded pair of two-input gate elements, the first of said cascaded pair of gate elements having applied to one input thereof said horizontal sync pulses and to the other input thereof the output of said fourth bistable element; the second of said cascaded pair of gate elements having applied to one input thereof the output of said first gate element and to the other input thereof the ouput of said fourth bistable element, a counter circuit connected to said second gate element of said cascaded pair for counting the pulses applied thereto and producing an output signal upon a predetermined number of pulses being applied thereto, means for applying the output of said counter to an input of said fourth bistable element to change the state thereof and to an input of said second bistable element to likewise change the state thereof.

14. The invention defined in claim 13 including a further mixer circuit, means for applying to said further mixer circuit as one input thereof a signal appearing at one of the terminals of said third bistable element, means for applying to another input of said further mixer circuit the said vertical drive pulses, means for applying to another input of said further mixer circuit said horizontal blanking signals, and means for utilizing the output of said further mixer circuit as a composite blanking signal in a television system.

15. In a television synchronizing generator a source of high frequency master clock pulse signals, a cascade chain of divider circuits connected to said source, said cascade chain of divider circuits having means for delivering output pulse train sets from selected stages thereof, an inverter circuit, a fixed time delay line, means for applying a train of pulses from a selected stage of said chain of dividers to said inverter circuit and to said delay line, a first counter for receiving pulses from said inverter circuit, a second counter for receiving pulses from said first counter and inverted pulses from said delay line, and a multivibrator circuit controlled by pulses from said second counter for generating horizontal synchronizing pulses.

16. A television synchronizing generator as defined in claim 15, including a second multivibrator for generating horizontal blanking pulses, and means for applying control pulses to said second multivibrator from said first counter.

17. A television synchronizing generator as defined in claim 15 including, a third multivibrator for generating vertical synchronizing pulses, means for applying control pulses to said third multivibrator from said delay line, a control circuit coupled to selected stages of said cascaded chain of divider circuits for developing an output pulse at predetermined intervals, and means coupling the output pulses of said control circuit to said third multivibrator.

18. A television synchronizing generator as defined in claim 15 including a fourth multivibrator for generating equalizing pulses, and means for inverting pulses from said delay line, and applying the inverted delayed pulses to said fourth multivibrator to control same.

19. In a solid state synchronizing generator having a source of high frequency pulses and a cascade chain of counter circuits connected to count pulses from said source and produce a set of basic control pulses from said counter circuits, and generator means controlled by said basic pulse set for generating equalizing pulses, vertical sync pulses, horizontal sync pulses, horizontal blanking pulses and horizontal drive pulses and a train of low frequency control signal pulses, improvement in the circuit for combining the said synchronizing pulses to form composite synchronizing signals which comprise a first two input gate element having as one input one of the signals to be composited and as the second controlled by said low frequency control signal input a gating signal pulse, said gating signal pulse being controlled by said low frequency control signal pulses, a second two-input gate element having as one input the vertical sync pulse to be passed and as the second input a further gating signal, said, further gating signal being controlled by said low frequency control signal pulses, a multiple input gate element having as one input thereof said equalizing pulses and as a second input the inverse of the gate signal applied to said first two-input gate element and as the third input the inverse of said further gating signal applied to said second two input gate elements, and a mixer circuit and means coupling the output signals of said gate circuits to said mixer circuit to produce said composite synchronizing signal.

References Cited

UNITED STATES PATENTS

| | | | |
|---|---|---|---|
| 2,525,102 | 10/1950 | Schade. | |
| 3,006,995 | 10/1961 | Fathauer. | |
| 3,297,952 | 1/1967 | Thylander | 328—63 |
| 3,359,367 | 12/1967 | Hiatt | 328—63 |

ROBERT L. GRIFFIN, Primary Examiner

ALFRED H. EDDLEMAN, Assistant Examiner

U.S. Cl. X.R.

328—63

PO-1050
(5/69)

UNITED STATES PATENT OFFICE

CERTIFICATE OF CORRECTION

Patent No. 3,487,166 Dated December 30, 1969

Inventor(s) William H. Ryan

It is certified that error appears in the above-identified patent and that said Letters Patent are hereby corrected as shown below:

Column 11, line 17, delete "controlled by said low frequency control signal"

SIGNED AND SEALED
JUN 2 1970

(SEAL)
Attest:

Edward M. Fletcher, Jr.
Attesting Officer

WILLIAM E. SCHUYLER, JR.
Commissioner of Patents